(12) United States Patent
Kang et al.

(10) Patent No.: US 9,267,451 B2
(45) Date of Patent: Feb. 23, 2016

(54) METHOD AND APPARATUS FOR CONTROLLING COMBUSTION NOISE IN AN INTERNAL COMBUSTION ENGINE

(75) Inventors: Jun-Mo Kang, Ann Arbor, MI (US); Chen-Fang Chang, Troy, MI (US); Hanho Yun, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1090 days.

(21) Appl. No.: 13/245,903

(22) Filed: Sep. 27, 2011

(65) Prior Publication Data

US 2013/0080026 A1  Mar. 28, 2013

(51) Int. Cl.
| | |
|---|---|
| F02D 13/02 | (2006.01) |
| F02D 41/00 | (2006.01) |
| F02M 25/07 | (2006.01) |
| F02B 1/12 | (2006.01) |
| F02B 75/12 | (2006.01) |
| F02D 41/30 | (2006.01) |
| F01L 13/00 | (2006.01) |

(52) U.S. Cl.
CPC ........ *F02D 41/0062* (2013.01); *F02D 13/0207* (2013.01); *F02D 13/0238* (2013.01); *F02D 13/0265* (2013.01); *F02M 25/0752* (2013.01); *F01L 13/0036* (2013.01); *F01L 2820/01* (2013.01); *F02B 1/12* (2013.01); *F02B 2075/125* (2013.01); *F02D 41/3035* (2013.01); *F02D 2041/001* (2013.01); *Y02T 10/128* (2013.01); *Y02T 10/18* (2013.01); *Y02T 10/47* (2013.01)

(58) Field of Classification Search
CPC .. Y02T 10/18; Y02T 10/128; F02M 25/0752; F02D 13/0207; F02D 13/0226; F02D 13/0234; F02D 13/0238; F02D 13/0265; F02D 41/006; F02D 41/3035; F02D 41/3064; F02D 2041/001; F02B 1/12
USPC .............. 123/90.15, 294, 295, 305, 345–348, 123/435, 436, 672, 679, 681, 682, 568.11, 123/568.14, 568.21; 701/102–105, 701/108–111
See application file for complete search history.

(56) References Cited

U.S. PATENT DOCUMENTS

| | | | |
|---|---|---|---|
| 6,910,461 B2 * | 6/2005 | Tanei et al. ............... | 123/406.29 |
| 7,128,063 B2 * | 10/2006 | Kang ....................... | 123/568.14 |

(Continued)

FOREIGN PATENT DOCUMENTS

| | | | |
|---|---|---|---|
| JP | 2007154858 A | * | 6/2007 |
| JP | 2008163807 A | * | 7/2008 |
| JP | 2009197740 A | * | 9/2009 |

*Primary Examiner* — Mahmoud Gimie
*Assistant Examiner* — John Zaleskas

(57) ABSTRACT

An internal combustion engine operates in a homogeneous-charge compression-ignition combustion mode. A method for controlling the internal combustion engine in response to a fast transient event from a low-load state to a high-load state includes operating the engine with a negative valve overlap between an intake valve and an exhaust valve, and determining a preferred combustion phasing responsive to the high-load state. A preferred EGR mass and a preferred intake valve timing corresponding to the preferred combustion phasing are determined. A first intake valve timing is determined in response to a difference between the preferred EGR mass and an actual EGR mass. The intake valve timing is controlled in response to a difference between the preferred intake valve timing and the first intake valve timing.

18 Claims, 3 Drawing Sheets

(56) References Cited

U.S. PATENT DOCUMENTS

| | | |
|---|---|---|
| 7,480,558 B2* | 1/2009 | Kang et al. .................... 701/108 |
| 2002/0046741 A1* | 4/2002 | Kakuho et al. ............ 123/568.14 |
| 2002/0066436 A1* | 6/2002 | Majima et al. ............. 123/406.47 |
| 2004/0134449 A1* | 7/2004 | Yang ............................ 123/27 R |
| 2004/0194759 A1* | 10/2004 | Yamaoka et al. ............... 123/435 |
| 2006/0005788 A1* | 1/2006 | Kuo et al. ........................ 123/21 |
| 2006/0016417 A1* | 1/2006 | Kuo et al. ...................... 123/294 |
| 2006/0016438 A1* | 1/2006 | Kang ........................ 123/568.14 |
| 2006/0196466 A1* | 9/2006 | Kuo et al. ...................... 123/295 |
| 2006/0288966 A1* | 12/2006 | Yang ............................ 123/27 R |
| 2007/0089697 A1* | 4/2007 | Hara et al. .................. 123/90.15 |
| 2007/0119417 A1* | 5/2007 | Eng et al. ....................... 123/305 |
| 2007/0144502 A1* | 6/2007 | Ogawa et al. ............. 123/568.14 |
| 2007/0250256 A1* | 10/2007 | Kang et al. ..................... 701/115 |
| 2008/0000462 A1* | 1/2008 | Ishibashi et al. ............... 123/672 |
| 2008/0046160 A1* | 2/2008 | Agrell ............................ 701/101 |
| 2008/0162020 A1* | 7/2008 | Itoga et al. ..................... 701/108 |
| 2008/0178836 A1* | 7/2008 | Yamashita et al. ............. 123/295 |
| 2008/0243356 A1* | 10/2008 | Kang et al. ..................... 701/102 |
| 2009/0078235 A1* | 3/2009 | Moriya et al. ............ 123/406.44 |
| 2009/0093946 A1* | 4/2009 | Yamashita et al. ............. 701/103 |
| 2009/0182485 A1* | 7/2009 | Loeffler et al. ................ 701/103 |
| 2009/0198431 A1* | 8/2009 | Cleary et al. ................... 701/103 |
| 2009/0228190 A1* | 9/2009 | Loeffler et al. ................ 701/103 |
| 2010/0121555 A1* | 5/2010 | Fischer et al. ................. 701/102 |
| 2010/0154740 A1* | 6/2010 | Mitsuishi ....................... 123/347 |
| 2010/0242901 A1* | 9/2010 | Seto et al. ...................... 123/299 |
| 2011/0108001 A1* | 5/2011 | Lee et al. ....................... 123/305 |
| 2011/0283972 A1* | 11/2011 | Wermuth et al. ......... 123/406.12 |

* cited by examiner

METHOD AND APPARATUS FOR CONTROLLING COMBUSTION NOISE IN AN INTERNAL COMBUSTION ENGINE

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure. Accordingly, such statements are not intended to constitute an admission of prior art.

Spark-ignition (SI) engines introduce an air/fuel mixture into each cylinder that is compressed in a compression stroke and ignited by a spark plug. Compression-ignition (CI) engines inject pressurized fuel into a combustion cylinder near top-dead-center (TDC) of the compression stroke that ignites upon injection. Combustion for both SI engines and CI engines involves premixed or diffusion flames controlled by fluid mechanics.

SI engines may operate in a variety of different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich in-cylinder combustion zones that form smoke and particulate emissions.

Engine airflow may be controlled by selectively adjusting position of the throttle valve and openings and closings of intake and exhaust valves. On engine systems so equipped, openings and closings of the intake and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

Engines operating in auto-ignition combustion modes account for operating conditions using calibration tables as part of an overall engine control scheme executed in an engine control module. Known HCCI engine control schemes include calibrations for controlling engine parameters based on a limited number of input parameters including, e.g., engine load, engine speed and engine coolant temperature. Measured output parameters are used to control the amount of hot residuals (via variable cam phasing) and the amount of cold residuals (via exhaust gas recirculation rate) and therefore control in-cylinder gas temperature.

Combustion phasing is an engine operating parameter that describes timing of an in-cylinder combustion parameter relative to piston position and is preferably measured with reference to crank angle. In-cylinder combustion parameters include a location of peak cylinder pressure (LPP) and a mass-burn fraction. A mass-burn fraction indicates a piston crank angle position at which a portion of the mass fraction of a cylinder charge is burned. A mass-burn fraction of interest includes a CA50 point (in crank angle degrees relative to TDC) at which an accumulated heat release of a cylinder charge reaches 50% of a total heat release. Combustion phasing is affected by temperature and composition of a cylinder charge during operation in an HCCI combustion mode.

HCCI control schemes achieve and maintain preferred combustion phasings by controlling temperature and composition of a cylinder charge using engine valve phasing and EGR flowrate controls. During a fast transient event from a low-load condition to a high-load condition, actual cylinder charge temperatures and compositions may deviate from preferred cylinder charge temperatures and compositions due to slow dynamic responses of an EGR valve and engine valve phasing control devices and associated fill-times. Such slow dynamic responses may result in over-advanced combustion phasing and objectionable audible combustion noise.

Systems for managing an increase in combustion noise during a low-to-high load transient include restricting a fuel ramping rate to avoid sudden and rapid deviation in the cylinder charge temperature and composition. Restricting a fuel ramping rate restricts a rate of increase in engine load, negatively affecting vehicle driveability.

SUMMARY

An internal combustion engine operates in a homogeneous-charge compression-ignition combustion mode. A method for controlling the internal combustion engine in response to a fast transient event from a low-load state to a high-load state includes operating the engine with a negative valve overlap between an intake valve and an exhaust valve, and determining a preferred combustion phasing responsive to the high-load state. A preferred EGR mass and a preferred intake valve timing corresponding to the preferred combustion phasing are determined. A first intake valve timing is determined in response to a difference between the preferred EGR mass and an actual EGR mass. The intake valve timing is controlled in response to a difference between the preferred intake valve timing and the first intake valve timing.

BRIEF DESCRIPTION OF THE DRAWINGS

One or more embodiments will now be described, by way of example, with reference to the accompanying drawings, in which.

DETAILED DESCRIPTION

Figure 1:
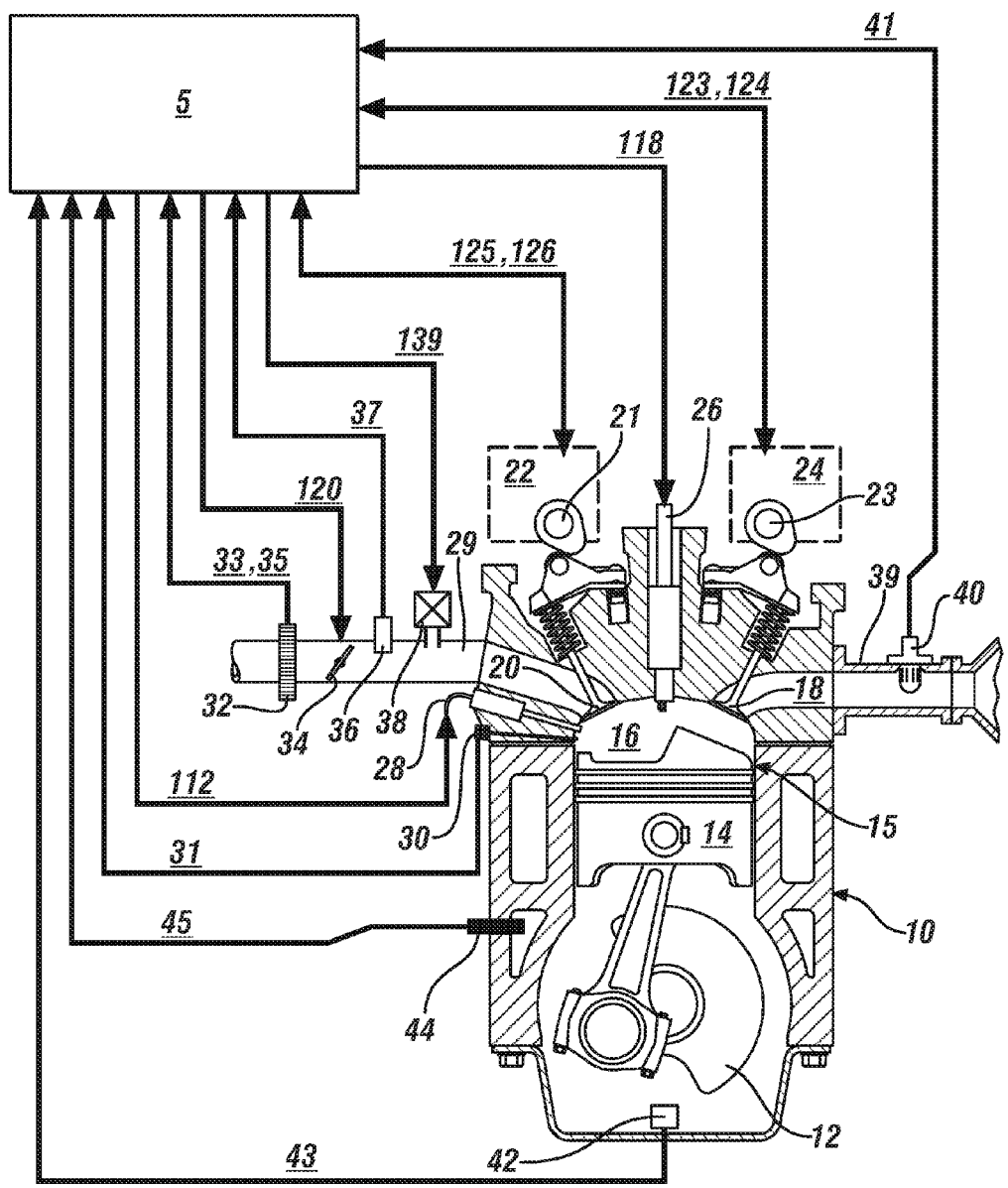
FIG. 1 is a schematic drawing of a spark-ignition internal combustion engine configured to operate in a homogeneous-charge compression-ignition (HCCI) combustion mode and a spark-ignition (SI) combustion mode, in accordance with the disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The exemplary engine 10 is configured to operate in one of a plurality of combustion modes preferably including a homogeneous-charge compression-ignition (HCCI) combustion mode and a spark-ignition (SI) combustion mode. The engine 10 may be controlled to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slideably movable in cylinders 15 which define variable volume combustion chambers 16. Each piston 14 is connected to a rotating crankshaft 12 by which linear reciprocating motion is translated to rotational motion. Each piston 14 translates between top-dead-center (TDC) and bottom-dead-center (BDC) positions in concert with rotation of the crankshaft 12. Each four-cycle combustion event includes intake, compression, power, and exhaust strokes with corresponding piston events including TDC-intake, BDC-compression, TDC-power, and BDC-exhaust.

An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow 33 and intake air temperature 35. A throttle valve 34 preferably includes an electronically controlled device that is used to control airflow to the engine 10 in response to a control signal 120 from the control module 5. A pressure sensor 36 in the intake manifold 29 is configured to monitor manifold absolute pressure 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 to achieve a preferred in-cylinder EGR mass by controlling opening of the EGR valve 38 via control signal 139.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust lift and timing of openings and closings of the intake and exhaust valves 20 and 18. In one embodiment, intake and exhaust variable cam phasing/variable lift control (VCP/VLC) devices 22 and 24, respectively, may be employed to control and adjust the lift and timing of the openings and closings of the intake and exhaust valves 20 and 18. The intake and exhaust VCP/VLC devices 22 and 24 are configured to interact with an intake camshaft 21 and an exhaust camshaft 23, respectively. Rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low-load operation, and a high-lift valve open position (about 8-13 mm in one embodiment) preferably for high speed and high-load operation.

The intake and exhaust VCP/VLC devices 22 and 24 each preferably includes a variable cam phasing (VCP) mechanism to control and adjust cam phasing (i.e., relative timing) to control openings and closings of the intake valve(s) 20 and the exhaust valve(s) 18 respectively. Intake valve timing refers to opening time (and thus the corresponding closing time) of the intake valve(s) 20 relative to TDC-intake in the respective cylinder 15. Exhaust valve timing refers to closing time (and thus the corresponding opening time) of the exhaust valve(s) 18 relative to TDC-intake in the respective cylinder 15.

Adjusting the valve timing refers to shifting the opening times (and thus the corresponding closing times) of the intake valve(s) 20 and shifting the closing times (and thus the corresponding opening times) of the exhaust valve(s) 18 relative to TDC-Intake. Adjusting the intake valve timing includes adjusting the opening time of the intake valve(s) 20, which includes one of advancing the opening time of the intake valve(s) 20 and retarding the opening time of the intake valve(s) 20. Adjusting the exhaust valve timing includes adjusting the closing time of the exhaust valve(s) 18, which includes one of advancing the closing time of the exhaust valve(s) 18 and retarding the closing time of the exhaust valve(s) 18.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126.

The control signals iVCP 126 and eVCP 124 may be controlled to symmetrically adjust the VCP mechanisms of the intake and exhaust VCP/VLC devices 22 and 24 to adjust the intake valve timing and the exhaust valve timing, respectively, in equal magnitudes of crankshaft degrees, either both towards or both away from TDC-intake. As such, an exhaust valve closing time (EVC) is symmetric with an intake valve opening time (IVO) around TDC-intake.

The control signals iVCP 126 and eVCP 124 may instead be controlled to asymmetrically adjust the VCP mechanisms of the intake and exhaust VCP/VLC devices 22 and 24 to independently adjust the intake valve timing and the exhaust valve timing. This may include adjusting the control signal iVCP 126 to adjust the intake valve timing while maintaining the control signal eVCP 124 to keep the exhaust valve timing 18 in an unchanged state. As such, the exhaust valve closing time (EVC) is asymmetric with the intake valve opening time (IVO) around TDC-intake.

The engine 10 employs a direct-injection fuel injection system including a plurality of high-pressure fuel injectors 28 that are configured to directly inject a mass of fuel into one of the combustion chambers 16 in response to a control signal (INJ_PW) 112 from the control module 5. It is appreciated that the control signal INJ_PW 112 includes pulsewidth duration, and start of injection relative to TDC. The fuel injectors 28 are supplied pressurized fuel from a fuel distribution system. Injection timing as used in this disclosure includes duration and start of injection for single and split injection schemes as may be employed in various combustion modes.

The engine 10 includes a spark-ignition system by which spark energy may be provided to a spark plug 26 for igniting or assisting in igniting cylinder charges in each of the combustion chambers 16 in response to a control signal 118 from the control module 5.

The engine 10 is equipped with various sensing devices for monitoring engine operation, including a crank sensor 42 having output RPM 43 indicative of crankshaft rotational position, i.e., crank angle and speed. A temperature sensor 44 is configured to monitor coolant temperature 45. An in-cylinder combustion sensor 30 is configured to monitor combustion 31. The in-cylinder combustion sensor 30 may include a cylinder pressure sensor configured to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the control module 5 to determine combustion phasing, i.e., timing of an in-cylinder combustion parameter relative to piston position, which may be measured relative to the crank angle for each of the cylinders 15 for each combustion cycle. It is appreciated that combustion phasing may be determined by other methods.

The control module 5 is configured to receive input signals from an operator (e.g., via an accelerator pedal and a brake pedal) to determine an operator torque request, from which an engine load command is derived. The control module 5 executes algorithmic code stored therein to control the aforementioned actuators to form a cylinder charge to generate power in response to the engine torque command, including controlling throttle position, spark-ignition timing, fuel injection mass and timing, EGR valve position to control flow of recirculated exhaust gases, and intake and/or exhaust valve timing and phasing. Valve timing and phasing may include NVO and lift of exhaust valve reopening (in an exhaust re-breathing strategy), and positive valve overlap (PVO).

Certain engine actuators referred to herein as fast engine actuators have fast dynamic responses, with the engine 10 capable of completely responding to an updated commanded output within a single engine cycle or cylinder event. Exemplary fast engine actuators include, e.g., the fuel injectors, the spark igniters, and discrete valve lift mechanisms such as the two-step VLCs. Other engine actuators referred to herein as slow engine actuators have slow dynamic responses due to component inertias, mechanical response times, and airflow fill-times, with the engine 10 capable of completely responding to an updated commanded output after multiple engine cycles or cylinder events. Exemplary slow engine actuators include, e.g., the EGR valve, the throttle valve, and the VCPs. A fast transient event is an engine operating event wherein a commanded change in engine load is greater than the capability of the engine to respond in a single engine cycle due to slow dynamic responses of the slow engine actuators.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Operating the engine 10 in the HCCI combustion mode preferably includes employing suitable settings for injection timing and spark timing (for example spark assist), intake/exhaust valve NVO, and low intake/exhaust valve lift. The throttle valve 34 is preferably in a substantially wide-open (WOT) position, i.e., fully un-throttled, or slightly throttled to create a vacuum in the intake manifold 29 to effect EGR flow. The engine 10 operates at a lean or stoichiometric air/fuel ratio. In one embodiment, in-cylinder EGR mass is controlled to a high dilution rate, e.g., greater than 40% of each cylinder air charge.

Operating the engine 10 in the homogeneous spark-ignition combustion (SI) mode preferably includes employing suitable settings for injection timing and spark timing, intake/exhaust valve PVO, and high intake/exhaust valve lift. The throttle valve 34 regulates the air flow in response to an operator torque request. The engine 10 operates at a stoichiometric air/fuel ratio. Fuel injection is timed to be executed during the intake stroke or the compression stroke. Spark timing is preferably discharged at a predetermined time subsequent to the fuel injection when a fuel/air charge within the cylinder is substantially homogeneous. Spark timing in the SI combustion mode is preferably controlled to a mean-best torque (MBT) spark timing at each engine operating point over the entire speed/load operating range. An MBT-spark timing map may be developed for the entire speed/load operating range for an embodiment of the engine 10 using known engine mapping techniques.

When the engine 10 operates in the HCCI combustion mode, an engine load command is used to determine a preferred combustion phasing. The engine load command may be defined by an operator torque request, as indicated by operator inputs to an accelerator pedal, brake pedal, and a transmission gear position (PRNDL) selector. During operation in the HCCI combustion mode, combustion phasing is affected by temperature and composition of a cylinder charge. The temperature and composition of the cylinder charge may be controlled by controlling engine parameters including intake and exhaust valve timing and in-cylinder EGR mass to achieve and maintain a preferred combustion phasing, as described herein. During a fast transient event from a low engine load condition to a high engine load condition, actual cylinder charge temperatures and compositions may deviate from preferred cylinder charge temperatures and compositions due to slow manifold emptying and filling dynamic responses associated with commanded changes in the EGR valve 38 and the intake and exhaust variable cam phasing/ variable lift control (VCP/VLC) devices 22 and 24, which may result in over-advanced combustion phasing and objectionable audible combustion noise.

Figure 2:
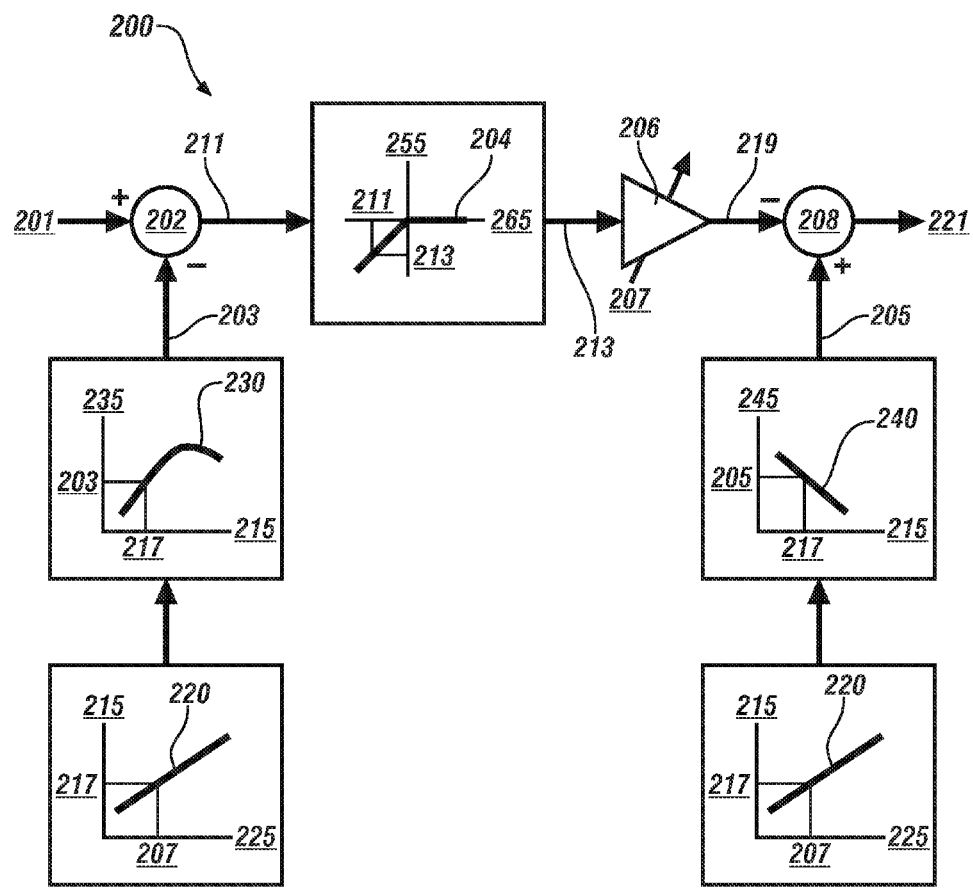
FIG. 2 schematically shows a combustion noise control routine that is executed during operation of an embodiment of the engine described with reference to FIG. 1 in the HCCI combustion mode, in accordance with the disclosure.

FIG. 2 schematically shows a combustion noise control routine 200 that executes during operation of an embodiment of the engine 10 described with reference to FIG. 1 in the HCCI combustion mode. The combustion noise control routine 200 regularly and periodically executes during ongoing operation of the engine 10. The combustion noise control routine 200 employs a first relationship 220, a second relationship 230, a third relationship 240 and an intake valve timing control relationship 204 to determine a preferred intake valve timing command 221 for controlling operation of the engine 10 to manage combustion noise during a transition from low-load operation to high-load operation in the HCCI combustion mode. The first, second, and third relationships 220, 230, and 240, respectively, are specific to an embodiment of the engine 10 and are preferably predetermined.

The first relationship 220 is employed to determine a preferred combustion phasing in response to the engine load when operating the engine 10 in the HCCI combustion mode. The engine load may be in the form of an operator torque request, an engine fueling command, or another suitable metric. The first relationship 220 is shown graphically, and includes engine load on the horizontal axis 225 in relation to combustion phasing on the vertical axis 215. The first relationship 220 indicates that a preferred combustion phasing 217 advances with an increase in engine load 207. The preferred combustion phasing 217 is determined in response to the engine load 207 using the first relationship 220.

The second relationship 230 is employed to determine a preferred EGR mass 203 for a cylinder charge in response to the preferred combustion phasing 217. The second relationship 230 is shown graphically, and includes combustion phasing on the horizontal axis 215 in relation to EGR mass on the vertical axis 235. The second relationship 230 indicates that the preferred EGR mass 203 for a cylinder charge increases with an advance in the preferred combustion phasing 217 up to a maximum preferred EGR mass, and a subsequent decrease in the preferred EGR mass 203 with any further advance in the preferred combustion phasing 217. The preferred EGR mass 203 may be determined in response to the preferred combustion phasing 217 using the second relationship 230.

The third relationship 240 may be employed to determine the preferred intake valve timing 205 in response to the preferred combustion phasing 217. The third relationship 240 is shown graphically, and includes combustion phasing on the horizontal axis 215 in relation to preferred intake valve timing on the vertical axis 245. The third relationship 240 indicates that the preferred intake valve timing 205 for a cylinder charge retards with an advance in the preferred combustion phasing 217. The preferred intake valve timing 205 may be determined in response to the preferred combustion phasing 217 using the third relationship 240.

The combustion noise control routine 200 executes during ongoing engine operation. This includes employing the first relationship 220 to determine the preferred combustion phasing 217 for a cylinder charge in response to the engine load 207, employing the second relationship 230 to determine the preferred EGR mass 203 for the cylinder charge in response to the preferred combustion phasing 217, and employing the third relationship 240 to determine the preferred intake valve timing 205 in response to the preferred combustion phasing 217. An actual in-cylinder EGR mass 201 for the cylinder charge is determined using monitored engine operating parameters. Suitable measurement or estimation routines to determine the actual in-cylinder EGR mass 201 for a cylinder charge using the engine operating parameters are known and not described herein.

A difference routine 202 determines an EGR mass difference 211 between the actual in-cylinder EGR mass 201 for a cylinder charge and the preferred in-cylinder EGR mass 203 for the cylinder charge. It is appreciated that during engine operation that is substantially steady-state, the EGR mass difference 211 is insubstantial. When a fast transient event is commanded, especially from a low-load state to a high-load state, the slow dynamic response associated with the EGR valve 38 and the intake and exhaust VCP/VLC devices 22 and 24 may result in over-advanced combustion phasing and cause objectionable audible combustion noise. A commanded fast transient event to the high-load state results in a discernible magnitude in the EGR mass difference 211.

The intake valve timing control relationship 204 prescribes an asymmetric intake valve timing 213 in response to the EGR mass difference 211. The asymmetric intake valve timing 213 is multiplied by a gain factor 206 that relates to the present engine load 207 to determine a load-adjusted asymmetric intake valve timing 219. The load-adjusted asymmetric intake valve timing 219 is used to asymmetrically adjust the intake valve timing (via asymmetric adjustments to the intake VCP mechanism) without a corresponding adjustment of the exhaust valve timing in response to the EGR mass difference 211. Asymmetrically adjusting the intake valve timing without a corresponding adjustment of the exhaust valve timing is shown graphically with reference to FIG. 3.

The intake valve timing control relationship 204 is shown graphically, and includes asymmetric intake valve timing 213 on the vertical axis 255 shown in relation to the EGR mass difference 211 on the horizontal axis 265. As indicated, the EGR mass difference 211 may be used to select a corresponding preferred asymmetric intake valve timing 213.

The intake valve timing control relationship 204 includes a relationship between the asymmetric intake valve timing 213 and the EGR mass difference 211. When the EGR mass difference 211 indicates the preferred in-cylinder EGR mass 203 is less than or equal to the actual in-cylinder EGR mass 201, the preferred asymmetric intake valve timing 213 is zero, i.e., the intake valve timing is symmetrical about TDC-intake with the exhaust valve timing. When the EGR mass difference 211 indicates the preferred in-cylinder EGR mass 203 is greater than the actual in-cylinder EGR mass 201, the preferred asymmetric intake valve timing 213 is negative and increasing in magnitude with an increase in the magnitude of the EGR mass difference 211. When the preferred asymmetric intake valve timing 213 is negative, it indicates a commanded change in the cam phasing and thus movement of the opening of the intake valve 20 towards TDC-intake (i.e. advancing intake valve timing), without a corresponding movement of the closing of the exhaust valve 18 towards TDC-intake.

A difference routine 208 calculates a difference between the preferred intake valve timing 205 and the load-adjusted asymmetric intake valve timing 219 to determine the preferred intake valve timing command 221. The preferred intake valve timing command 221 is an intake valve timing command that achieves cylinder charge cooling to reduce combustion noise and is responsive to the load during the fast transient event from low-load condition to high-load condition. The preferred intake valve timing command 221 is communicated to the control module 5, which uses it as the basis for determining the control signal iVCP 126 for control operation of the intake VCP/VLC device 22 to control phasing of the intake camshaft 21.

This action permits quickly advancing the intake valve closing time toward TDC-intake in proportion to the difference between the preferred intake valve timing 205 and the load-adjusted asymmetric intake valve timing 219. Such action reduces cylinder charge temperature by asymmetrically adjusting intake valve timing (via asymmetric adjustments to the intake VCP mechanism) without a corresponding adjustment of the exhaust valve timing. The asymmetrically-adjusted intake valve timing creates a period of time during the intake stroke wherein the intake valve 20 is closed while the corresponding piston 14 is moving towards BDC-compression and expanding the cylinder charge without addition of intake air. The expansion of the cylinder charge causes a reduction in the cylinder charge temperature due to a charge cooling effect, reducing combustion noise during the subsequent power stroke. Thus, combustion noise may decrease without a prescribed in-cylinder EGR mass during the fast transient event from low-load condition to high-load condition.

Figure 3:
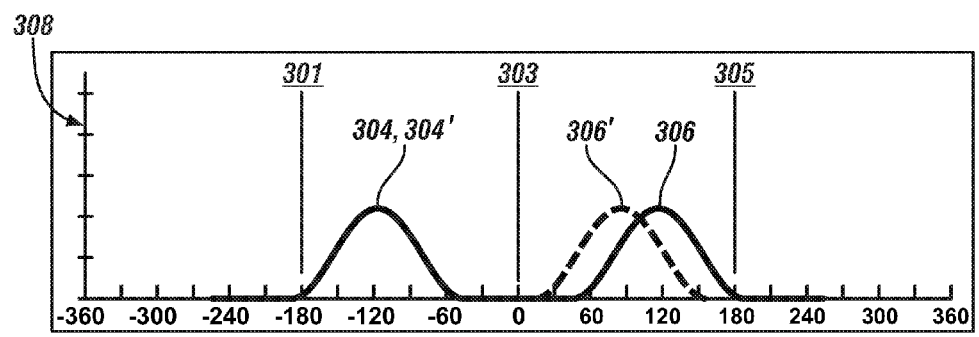
FIG. 3 graphically shows exemplary data associated with engine valve lift depicting operation of an embodiment of the engine described with reference to FIG. 1 operating in the HCCI combustion mode at low valve lift with negative valve overlap (NVO) during a single exhaust stroke and a subsequent intake stroke, in accordance with the disclosure.

FIG. 3 graphically shows exemplary data associated with engine valve lift depicting the engine 10 operating in the HCCI combustion mode at low valve lift with NVO during a single exhaust stroke and subsequent intake stroke. The vertical axis 308 shows engine valve lift (mm) in relation to engine crank angle 302 (° crank angle rotation) including BDC-exhaust 301 shown at −180°, TDC-intake 303 shown at 0°, and BDC-compression 305 shown at 180°. A first opening and closing of the exhaust valve 304 and a first opening and closing of the intake valve 306 are shown, including the NVO period. The opening and closing of the exhaust valve 304 and the first opening and closing of the intake valve 306 are symmetric around TDC-intake 303. A second opening and closing of the exhaust valve 304' and a second opening and closing of the intake valve 306' are shown, indicating the opening time of the intake valve advanced towards TDC-intake 303 asymmetrically in relation to the second opening and closing of the exhaust valve 304'. Thus the second opening and closing of the exhaust valve 304' and the second opening and closing of the intake valve 306' depict asymmetrically adjusting the intake valve timing without a corresponding adjustment of the exhaust valve timing.

Figure 4:
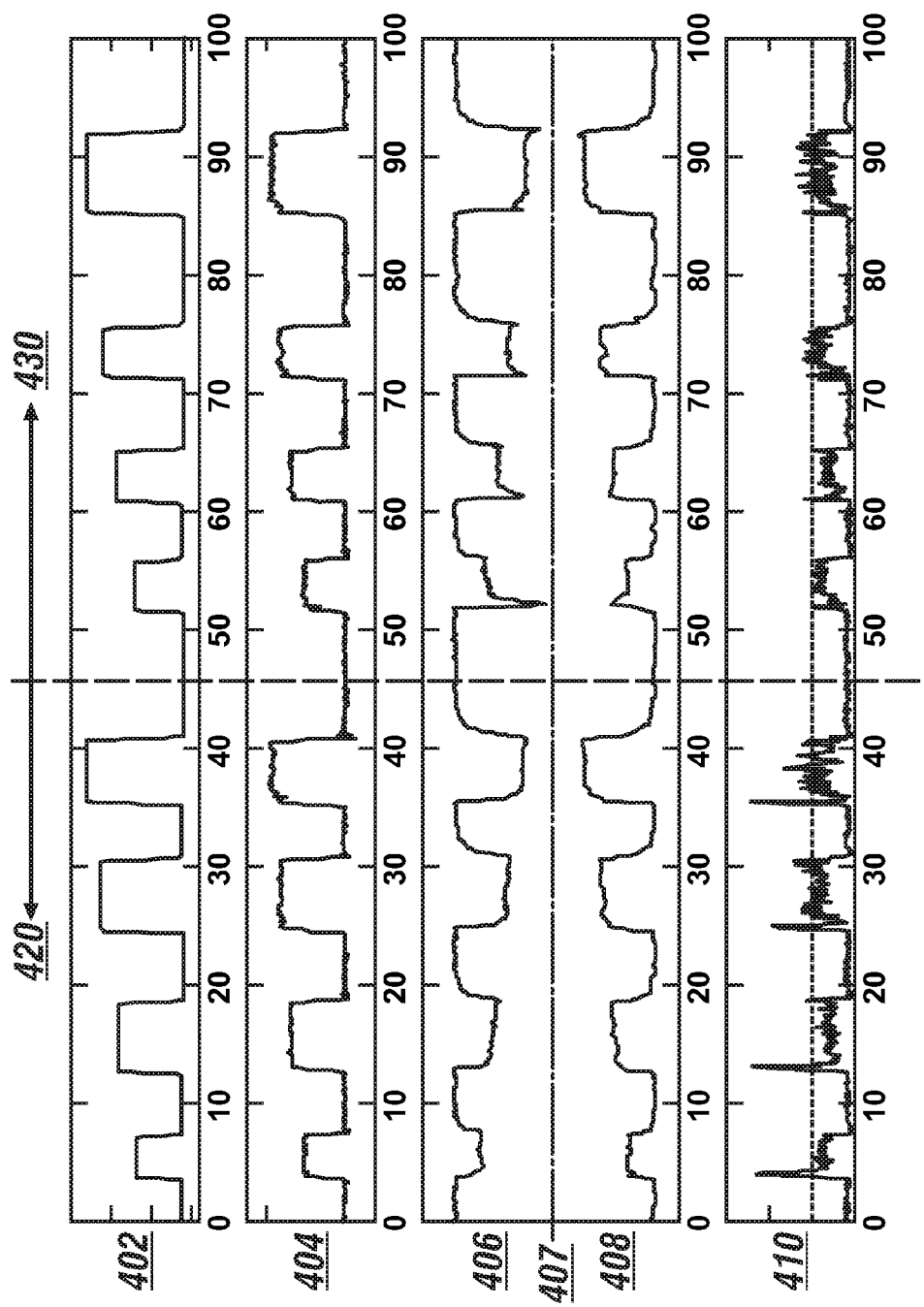
FIG. 4 graphically shows experimentally-derived data from operation of a four-cylinder embodiment of the engine described with reference to FIG. 1 operating in an HCCI combustion mode and employing an embodiment of the combustion noise control routine described with reference to FIG. 2, in accordance with the disclosure.

FIG. 4 graphically shows experimentally-derived data from a four-cylinder engine that is an embodiment of the engine 10 operating in an HCCI combustion mode and employing an embodiment of the combustion noise control routine 200 described with reference to FIG. 2. The data includes engine load as indicated by a fuel command (mg) 402, engine torque output as indicated by NMEP (bar) 404, intake valve timing 406 and exhaust valve timing 408 in relation to TDC-intake 407, and combustion noise, as indicated by an average ringing index (MW) 410, all of which are plotted during a first operating period 420 and a second operating period 430. The data for the average ringing index 410 is an average over four contiguous combustion events. The data associated with the intake valve timing 406 indicates timing of opening of the intake valve and the data associated with the exhaust valve timing 408 indicates timing of closing of the exhaust valve. The first operating period 420 depicts approximately 50 seconds of engine operation and corresponds to operating the engine 10 without benefit of the combustion noise control routine 200 described with reference to FIG. 2. The second operating period 430 depicts approximately 50 seconds of engine operation and corresponds to operating the engine 10 and employing the combustion noise control routine 200 described with reference to FIG. 2.

During the first operating period 420, the engine load (indicated by the fuel command 402) shifts back and forth between a low-load condition and a high-load condition in a stepwise manner, with the magnitude of the high-load condition increasing each subsequent step. This stepwise shifting from the low-load condition to the high-load condition simulates commanding a fast transient event from a low-load state to a high-load state. The engine output torque 404 increases in a corresponding manner. The intake valve timing 406 indicates that timing of opening of the intake valve decreases with increasing load, i.e., moves towards TDC-intake 407. The exhaust valve timing 408 indicates that the corresponding timing of closing of the exhaust valve increases with the increasing load, i.e., moves towards TDC-intake 407. The data during the first operating period 420 indicates spikes in the average ringing index (MW) 410 for a short period of time during each transient event when the engine load indicated by the fuel command 402 shifts from the low-load condition to the high-load condition. The spikes in the average ringing index (MW) 410 indicate bursts of audible noise. The audible combustion noise eventually diminishes as the combustion phasing indicated by the cylinder charge temperature and the cylinder charge composition is brought under control.

An embodiment of the combustion noise control routine 200 described with reference to FIG. 2 is employed during the second operating period 430. During the second operating period 430, the engine load (indicated by the fuel command 402) shifts back and forth between the low-load condition and the high-load condition in a stepwise manner that is substantially equivalent to the engine load occurring during the first operating period 420. The engine output torque 404 increases in a corresponding manner. The intake valve timing 406 is asymmetric to the exhaust valve timing 408 relative to TDC-intake 407. The combustion noise control routine 200 controls the intake valve timing 406 in a manner that causes substantial changes in the intake valve timing 406 in response to the stepwise shift in engine load from the low-load condition to the high-load condition.

The data associated with the second operating period 430 indicates an absence of spikes in the average ringing index 410 during each transient event when the engine load indicated by the fuel command 402 shifts from the low-load condition to the high-load condition in a stepwise manner, indicating an absence of bursts of audible noise. An overall magnitude of the average ringing index 410 and thus the audible combustion noise is substantially unchanged as the combustion phasing indicated by the cylinder charge temperature and the cylinder charge composition is brought under control.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an internal combustion engine operating in a homogeneous-charge compression-ignition combustion mode in response to a fast transient event from a low-load state to a high-load state, comprising:
   operating the engine with a negative valve overlap between an intake valve and an exhaust valve;
   determining a preferred combustion phasing responsive to the high-load state;
   determining a preferred EGR mass corresponding to the determined preferred combustion phasing based on a relationship between preferred combustion phasing and preferred EGR mass;
   determining a preferred intake valve timing corresponding to the determined preferred combustion phasing based on a relationship between preferred combustion phasing and preferred intake valve timing;
   determining an adjusted intake valve timing; comprising:
      determining a prescribed intake valve timing in response to a difference between the preferred EGR mass and an actual EGR mass based upon a relationship between the EGR mass difference and prescribed intake valve timing; and
      multiplying the prescribed intake valve timing by a gain factor related to engine load;
   determining a preferred intake valve timing command based upon a difference between the preferred intake valve timing and the adjusted intake valve timing; and
   controlling an intake variable cam phasing device in response to the preferred intake valve timing command.

2. The method of claim 1, wherein controlling the intake variable cam phasing device in response to the difference between the preferred intake valve timing and the adjusted intake valve timing comprises controlling the intake variable cam phasing device such that an intake valve opening time is asymmetric with respect to an exhaust valve closing time around TDC-intake.

3. The method of claim 2, wherein the intake variable cam phasing device comprises adjusting the intake variable cam phasing device in response to the difference between the preferred intake valve timing and the adjusted intake valve timing and not adjusting an exhaust variable cam phasing device.

4. The method of claim 1, wherein determining the prescribed intake valve timing in response to the difference between the preferred EGR mass and the actual EGR mass comprises selecting a prescribed intake valve timing in response to the difference between the preferred EGR mass and the actual EGR mass.

5. The method of claim 4, wherein selecting the prescribed intake valve timing comprises selecting a prescribed intake valve timing such that an intake valve opening time is asymmetric with respect to an exhaust valve closing time around TDC-intake when the preferred EGR mass is greater than the actual EGR mass.

6. The method of claim 5, comprising advancing the prescribed intake valve timing in response to an increase in the magnitude of the difference between the preferred EGR mass and the actual EGR mass.

7. The method of claim 5, wherein the prescribed intake valve timing comprises a change in the intake valve opening time towards TDC-intake without a corresponding change in an exhaust valve closing time towards TDC-intake.

8. The method of claim 4, wherein selecting the prescribed intake valve timing comprises selecting the prescribed intake valve timing of zero such that an intake valve opening time is symmetric with respect to an exhaust valve closing time around TDC-intake when the preferred EGR mass is less than or equal to the actual EGR mass.

9. The method of claim 1, wherein determining the adjusted intake valve timing comprises:
   determining a prescribed intake valve timing such that an intake valve opening time is asymmetric with respect to an exhaust valve closing time around TDC-intake in response to the difference between the preferred EGR mass and the actual EGR mass; and
   multiplying the asymmetric intake valve timing by a gain factor related to engine load.

10. A method for controlling an internal combustion engine configured to control intake and exhaust valve timing, comprising:
   operating the engine with a negative valve overlap between the intake valve and the exhaust valve;
   determining a preferred combustion phasing responsive to an engine load command;
   determining a preferred EGR mass corresponding to the determined preferred combustion phasing based on a relationship between preferred combustion phasing and preferred EGR mass;
   determining a preferred intake valve timing corresponding to the determined preferred combustion phasing based on a relationship between preferred combustion phasing and preferred intake valve timing;
   determining an adjusted intake valve timing; comprising:
      determining a prescribed intake valve timing in response to a difference between the preferred EGR mass and an actual EGR mass based upon a relationship between the EGR mass difference and prescribed intake valve timing; and
      multiplying the prescribed intake valve timing by a gain factor related to engine load;
   determining a preferred intake valve timing command based upon a difference between the preferred intake valve timing and the adjusted intake valve timing; and
   controlling the intake valve timing in response to the preferred intake valve timing command.

11. The method of claim 10, wherein controlling the intake valve timing comprises controlling the intake valve timing in response to the difference between the preferred intake valve timing and the adjusted intake valve timing such that an intake valve opening time is asymmetric with respect to an exhaust valve closing time around TDC-intake.

12. The method of claim 11, wherein controlling the intake valve timing comprises adjusting the intake valve timing in response to the difference between the preferred intake valve timing and the adjusted intake valve timing and not adjusting an exhaust valve timing.

13. The method of claim 10, wherein determining the prescribed intake valve timing comprises selecting a prescribed intake valve timing in response to the difference between the preferred EGR mass and the actual EGR mass.

14. The method of claim 13, wherein selecting the prescribed intake valve timing comprises selecting a prescribed intake valve timing such that an intake valve opening time is asymmetric with respect to an exhaust valve closing time around TDC-intake when the preferred EGR mass is greater than the actual EGR mass.

15. The method of claim 14, comprising advancing the prescribed intake valve timing in response to an increase in the magnitude of the difference between the preferred EGR mass and the actual EGR mass.

16. The method of claim 14, wherein the prescribed intake valve timing comprises a change in the intake valve opening time towards TDC-intake without a corresponding change in the exhaust valve closing time towards TDC-intake.

17. The method of claim 13, wherein selecting the prescribed intake valve timing comprises selecting the prescribed intake valve timing of zero such that an intake valve opening time is symmetric with respect to an exhaust valve closing time around TDC-intake when the preferred EGR mass is less than or equal to the actual EGR mass.

18. The method of claim 10, wherein determining the adjusted intake valve timing comprises:
    determining a prescribed intake valve timing such that an intake valve opening time is asymmetric with respect to an exhaust valve closing time around TDC-intake in response to the difference between the preferred EGR mass and the actual EGR mass; and
    multiplying the asymmetric intake valve timing by a gain factor related to engine load.

* * * * *